(12) United States Patent
Hennebert et al.

(10) Patent No.: US 11,314,891 B2
(45) Date of Patent: Apr. 26, 2022

(54) METHOD AND SYSTEM FOR MANAGING ACCESS TO PERSONAL DATA BY MEANS OF A SMART CONTRACT

(71) Applicant: COMMISSARIAT A L'ENERGIE ATOMIQUE ET AUX ENERGIES ALTERNATIVES, Paris (FR)

(72) Inventors: Christine Hennebert, Grenoble (FR); Laurent-Frederic Ducreux, Grenoble (FR); Matthieu Volat, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 637 days.

(21) Appl. No.: 16/363,395

(22) Filed: Mar. 25, 2019

(65) Prior Publication Data
US 2019/0294817 A1    Sep. 26, 2019

(30) Foreign Application Priority Data
Mar. 26, 2018   (FR) .................................. 18 52585

(51) Int. Cl.
*G06F 21/00* (2013.01)
*G06F 21/62* (2013.01)
(Continued)

(52) U.S. Cl.
CPC ...... *G06F 21/6245* (2013.01); *G06F 16/1824* (2019.01); *G06Q 20/3674* (2013.01);
(Continued)

(58) Field of Classification Search
CPC .............. G06F 21/6245; G06F 16/1824; G06F 21/335; G06Q 20/3674; G06Q 20/3829; H04L 9/0861; H04L 2209/38
See application file for complete search history.

(56) References Cited

U.S. PATENT DOCUMENTS 10,373,158 B1 *   8/2019  James .................. G06Q 20/065
10,540,654 B1 *   1/2020  James .................. G06Q 20/223
(Continued)

FOREIGN PATENT DOCUMENTS

CN    107682331 A      2/2018
GB        2573499 A  * 11/2019   ......... G06Q 20/3829
(Continued)

OTHER PUBLICATIONS

U.S. Appl. No. 16/234,020, filed Dec. 27, 2018, Christine Hennebert.
(Continued)

*Primary Examiner* — John B King
(74) *Attorney, Agent, or Firm* — Oblon, McClelland, Maier & Neustadt, L.L.P.

(57) ABSTRACT

A method/a system for accessing personal data using an access token server, a data server and a blockchain. The access token server generates the access rights of different users in the form of access tokens. The access token server stores an access token by transmitting it via a first transaction, to a first smart contract of the blockchain. A user can request an access authorization by transmitting a second transaction to a second smart contract that can access the token by presenting cryptographic elements to authenticate the user. A granted authorization is recorded by the second contract in the blockchain. A user may access the personal data by transmitting an access request to the data server. This interrogates the second smart contract to verify the authorization and to obtain the access token. The data server next transmits the stored personal data to a URL specified in the token.

16 Claims, 8 Drawing Sheets

(51) Int. Cl.
*G06F 16/182* (2019.01)
*G06Q 20/36* (2012.01)
*G06Q 20/38* (2012.01)
*H04L 9/08* (2006.01)
*G06F 21/33* (2013.01)

(52) U.S. Cl.
CPC ....... *G06Q 20/3829* (2013.01); *H04L 9/0861* (2013.01); *G06F 21/335* (2013.01); *H04L 2209/38* (2013.01)

(56) References Cited

U.S. PATENT DOCUMENTS

| | | | |
|---|---|---|---|
| 11,080,689 B1* | 8/2021 | Remeika, Jr. | G06Q 20/381 |
| 11,139,955 B1* | 10/2021 | So | G06Q 20/3674 |
| 11,200,569 B1* | 12/2021 | James | G06Q 20/3829 |
| 2017/0155515 A1* | 6/2017 | Androulaki | H04L 9/008 |
| 2017/0213210 A1* | 7/2017 | Kravitz | G06Q 30/06 |
| 2017/0228731 A1* | 8/2017 | Sheng | G06Q 20/401 |
| 2018/0025442 A1* | 1/2018 | Isaacson | G06F 3/048 705/26.62 |
| 2018/0032383 A1* | 2/2018 | Surcouf | H04L 9/088 |
| 2018/0060496 A1 | 3/2018 | Bulleit et al. | |
| 2018/0114205 A1* | 4/2018 | Thomas | G06Q 40/02 |
| 2018/0218176 A1* | 8/2018 | Voorhees | H04L 9/3213 |
| 2019/0081796 A1* | 3/2019 | Chow | H04L 9/30 |
| 2019/0089525 A1* | 3/2019 | Roets | H04L 9/3213 |
| 2019/0251271 A1* | 8/2019 | Roets | H04L 9/3239 |
| 2019/0356641 A1* | 11/2019 | Isaacson | G06Q 20/384 |
| 2020/0162259 A1* | 5/2020 | Wang | H04L 9/3228 |
| 2020/0259640 A1* | 8/2020 | Leavy | H04L 9/32 |
| 2020/0329018 A1* | 10/2020 | Tali | H04L 9/32 |

FOREIGN PATENT DOCUMENTS

WO WO 2018/019364 A1 2/2018
WO WO-2018192931 A1 * 10/2018 ........... G06Q 20/023

OTHER PUBLICATIONS

U.S. Appl. No. 16/233,974, filed Dec. 27, 2018, Christine Hennebert.
French Preliminary Search Report dated Dec. 18, 2018 in French Application 18 58585, filed on Mar. 26, 2018 (with English Translation of Categories of Cited Documents).
Zyskind, G., et al. "Decentralizing Privacy: Using Blockchain to Protect Personal Data", 2015 IEEE CS Security and Privacy Workshops, IEEE Computer Society, 2015, 5 pages.

* cited by examiner

METHOD AND SYSTEM FOR MANAGING ACCESS TO PERSONAL DATA BY MEANS OF A SMART CONTRACT

TECHNICAL FIELD

The present invention relates, generally speaking, to the management of access to personal data, such as data derived from connected objects. It also relates to the field of blockchains and more specifically those that make it possible to execute smart contracts.

PRIOR ART

The management of access rights in an information system is particularly critical, recently accentuated by the perspective of the forthcoming entry into force of the General Data Protection Regulation (GDPR) 2016/679 in the EU.

The GDPR (art. 25) notably requires that technical measures are taken as of the design of the information system to guarantee the protection of personal data and the restriction of their access depending on the specific purpose of each processing.

In particular, it is necessary to protect access to data which could reveal the behaviour or the lifestyle of a given user. Thus, for example, the data collected by a network of sensors intended to measure the electrical consumption and/or water consumption of a user of an IoT (Internet of Things) system could give away the times he is present in his home and make said home more vulnerable to intrusions.

Different methods may be used to protect personal data and respect the privacy of users. The anonymization of data may notably be cited, consisting in storing and, if needs be, processing personal data without possibility of identifying the person to whom these data belong, and the confidentiality of data, realised by encryption of personal data by means of a key.

Whatever the method for protecting personal data, it is necessary to define a method for managing the access rights to these data, notably specifying who has access to what data and under what conditions.

The management of access rights in an IoT system is generally based on a version derived from the OAuth 2.0 protocol, represented in FIG. 1.

It may be recalled that the principle of OAuth 2.0 is to grant to a client application an access right to resources available on a resource server, by means of a token materialising the access right in question.

When a client application, 110, (residing for example in Alice's smartphone) wishes to access resources derived from sensors 190 (typically measurements derived from sensors belonging to Alice) and stored in the database of a data server 130, it requests from the authorization server 120 an access right to the resources in question. If a user profile with the corresponding access rights has been created beforehand in the authorization server (AuthZ), said application is granted access to the resources in question. To do so, the authorization server generates at step 1 an access token and transmits it to the client application. The validity of the access token may depend on contextual elements and is limited in time. The user next transmits at step 2 a request to the data server 130 by presenting his access token. The data server 130 then verifies at step 3 with the authorization server 120 if the user indeed has access rights to the requested resources and, if this is effectively the case, receives at step 4 an authorization from the latter. The data server then responds favourably to the request of the user and, at step 5, transmits to the client application the requested resources.

The solution represented in FIG. 1 becomes however very complex to use from the moment that an agile policy for managing access rights has to be implemented, by distinguishing users on the basis of their identity or their contextual attributes, such as belonging to a group, for example. In such a case, the addition of a user to a group or the departure from this group requires a revocation of the key for all the members of the former group and the distribution of a new encryption key to all the members of the new group. Moreover, if a user belongs to several groups, this leads to having to encrypt the same data with different keys.

Moreover, the solution represented in FIG. 1 calls upon a centralised trusted third party, namely the authorization server 120. This is in charge of the authentication of users, the verification of their access rights and the delivery of access authorizations. It is thus a critical element in terms of security, potentially vulnerable in the event of attacks, notably denial of service attacks.

The article of G. Zyskind et al. entitled "Decentralizing privacy: using blockchain to protect personal data", published in Security and Privacy Workshop (SPW), pp. 180-184, May 2015, proposes decentralising the management of personal data using a blockchain. The access authorizations are delivered directly by the owner of the data and stored in the blockchain by means of a transaction ($T_{access}$). The data are stored in an encrypted manner and distributed in the nodes of the network by means of a distributed hash table (DHT).

This solution, although no longer requiring a centralised trusted third party, does not enable a delegated management of access rights, nor an agile management of these rights.

The objective of the present invention is consequently to propose a method and a system for managing access rights to personal data which do not necessitate resorting to a centralised trusted third party, which enable an agile and delegated management of access rights, notably when it is necessary to manage groups of users.

DESCRIPTION OF THE INVENTION

The present invention is defined by a method for accessing personal data belonging to a data owner, the access rights of a user to these data for a predetermined use being represented by an access token, in which:

(a) the access tokens are generated by an access token server in accordance with the access policies stored in a first database hosted by said server, the access token of said user being identified by a token identifier and transmitted, by means of a first transaction, to a first smart contract stored in a blockchain, the first smart contract recording the access token in the blockchain;

(b) a terminal of said user transmits, by means of a second transaction, an access authorization request identified by an authorization request identifier, to a second smart contract stored in the blockchain, the second smart contract interrogating the first smart contract and obtaining the access token by supplying to it cryptographic elements making it possible to authenticate the user, then determining if the access conditions contained in the token are indeed met and, in the affirmative, recording the access authorization in the blockchain;

(c) the terminal of said user transmits an access request to the data server, the access request comprising said authorization request identifier, the data server interrogating the second smart contract by supplying to it said authorization request identifier, the second smart contract returning to the data server the token corresponding to this request if an access authorization corresponding to the authorization request identifier is indeed recorded in the blockchain, the data server reading the personal data stored in a second personal data base at a URL specified in the token, and transmitting them to the terminal of said user.

According to an alternative, at step (a), following the emission of the first transaction, the access token server transmits a consent request to the terminal of the owner of the personal data and this emits a third transaction destined for a third smart contract stored in the blockchain, the third transaction comprising a first Boolean variable indicating the consent or the refusal of the consent of the owner of the data to access these data by said user.

The second transaction may comprise the payment of an amount in cryptocurrency to the owner of the data.

Said cryptographic elements typically comprise a public key of the user and a wallet address obtained by hashing said public key.

Prior to step (b), the token identifier is advantageously transmitted to the terminal of said user.

Preferably, at step (b) the access authorization request is recorded in the blockchain.

The access token advantageously comprises a first field containing the token identifier, a second field containing an identifier of the user, a third field containing an identifier of the owner of the personal data, a fourth field containing the URL in which is found the personal data and a fifth field containing a digital fingerprint of a set of access parameters.

In this case, at step (c), the access request transmitted by the terminal of said user further comprises said set of access parameters and the data server verifies that the digital fingerprint contained in the access token indeed corresponds to said set of access parameters before reading the stored personal data and transmitting them to said user. The second field may also comprise a wallet address of the user and a public key of the user and the third field may comprise a wallet address of the owner of the data and a public key of the latter.

The access token may further have a sixth field containing the expiry date of said token.

The access token may further comprise a seventh field containing a Boolean variable indicating if the owner of the data has given his consent.

Finally, the access token may comprise an eighth field containing a Boolean variable indicating if an amount required for the use of the token has indeed been paid.

Advantageously, a fourth smart contract is stored in the blockchain, this fourth contract having the function of keeping up to date a balance of the cryptocurrency accounts of the user, of the owner of the data, of the access token server and of the data server.

According to an alternative, at step (c), the personal data read in the second database are transmitted to the terminal of said user via a secure channel.

The data server may carry out a processing of the personal data before transmitting them to the terminal of said user.

The invention is also defined by a system for managing access to personal data comprising an access token server hosting a first database containing the access profiles of different users, a terminal of a user, a data server hosting a second database in which are stored said personal data, the terminal of said user being connected to the data server via a secure channel, the access token server, the terminal of said user and the data server each having an interface enabling them to communicate with a blockchain;

said access token server being configured to generate an access token for a user, in accordance with the access policies stored in the first database, and to transmit said token, identified by a token identifier, to a first smart contract stored in the blockchain, by means of a first transaction, the first smart contract recording the access token in the distributed ledger of the blockchain;

the terminal of said user being configured to transmit, by means of a second transaction, an access authorization request identified by an authorization request identifier, to a second smart contract stored in the blockchain, the second smart contract interrogating the first smart contract and obtaining the access token by supplying to it cryptographic elements making it possible to authenticate the user, then determining if the access conditions contained in the token are indeed met and, in the affirmative, recording the access authorization in the blockchain;

the terminal of said user being further configured to transmit an access request to the data server, the access request comprising said authorization request identifier, the data server then interrogating the second smart contract by supplying to it said authorization request identifier, the second smart contract returning to the data server the token if an access authorization corresponding to the authorization request identifier is indeed recorded in the blockchain;

the data server being configured to read the personal data stored in the second database, at a URL specified in the token, and to transmit the personal data to the terminal of said user via the secure channel.

BRIEF DESCRIPTION OF THE DRAWINGS

Other characteristics and advantages of the invention will become clear from reading a preferential embodiment of the invention, with reference to the appended figures, among which.

DETAILED DESCRIPTION OF PARTICULAR EMBODIMENTS

Figure 1:
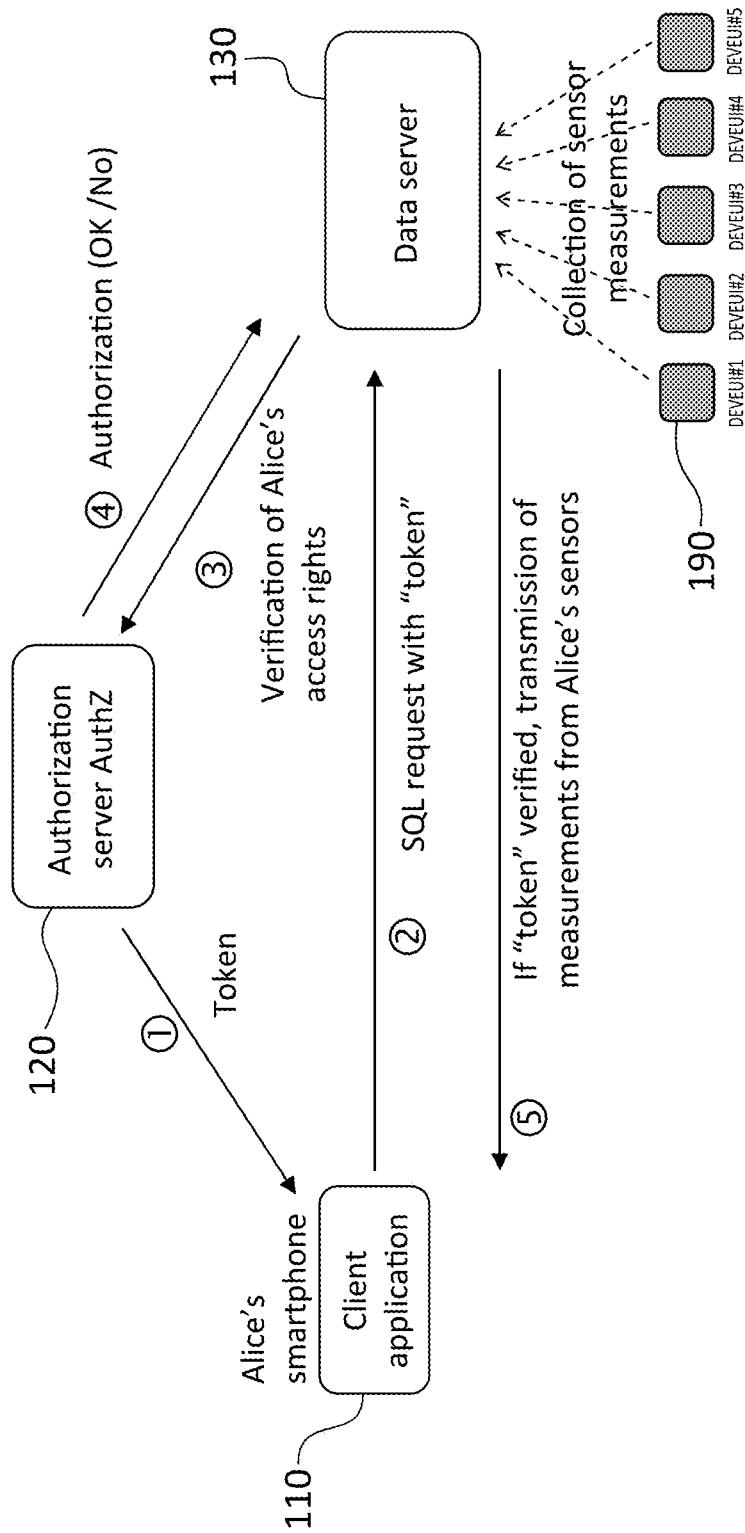
FIG. 1, already described, schematically represents a method for managing access rights to the resources of an IoT system, known from the prior art.

The present invention relates to the management of access to personal data and more specifically access rights to these data. Personal data is taken to mean any information relating to a natural person directly or indirectly identified or identifiable. These personal data may notably come from connected devices (sensors of an IoT network) situated in the environment of the natural person (home for example).

To guarantee the privacy of natural persons and notably users of an IoT network, it is necessary to protect access to this personal data. In other words, it must not be possible for a third party to be able to have access to these personal data without having obtained beforehand the authorization of the corresponding natural person. This natural person will be designated hereafter as the owner of the personal data.

Access to these data must comply with a set of access policies defined beforehand. The aim of these access policies is to describe who can access what under what conditions and, if needs be, for what use and at what cost. In particular, different users could benefit from different access authorizations as a function of different use cases and their respective profiles. The access policies of the different users could be advantageously described using a mark-up language.

The present invention is based on a network architecture without central security server, such as the access authorization server known from the prior art. The role of the traditional security server is here devolved in part to smart contracts operated by a blockchain/a distributed ledger.

It may be recalled that a blockchain is composed of blocks chained by means of a cryptographic mechanism. The chaining is obtained by inserting the hash of the preceding block in the content of the current block. The addition of new blocks to the chain is carried out at regular intervals. The addition of a block to the chain implies that its content has been verified, as well as the creation of a "link" linking the block to the chain. This link is created by a "mining" operation, currently a "proof of work" consisting for example in attaching to the block a word, such that the hash of the word concatenated to the block verifies a predetermined constraint.

The blockchain forms a ledger that is distributed and replicated in the different nodes of the network. These nodes can interact with the blockchain and use its content. The integrity of the information included in the blocks of the chain is guaranteed by cryptographic functions.

Hereafter a blockchain capable of storing not only transactions (as in Bitcoin) but also executing the code of smart contracts will be considered. An example of such a blockchain is Ethereum. A smart contract is a software code that can be stored in a block of the distributed ledger. This software code may be accessed at a determined address and may comprise one or more functions. The execution of a function of the smart contract may be triggered by sending a transaction transmitted from a wallet to the address of the code in question, the transaction comprising the identification of the function to execute and the input arguments expected by this function.

Figure 2:
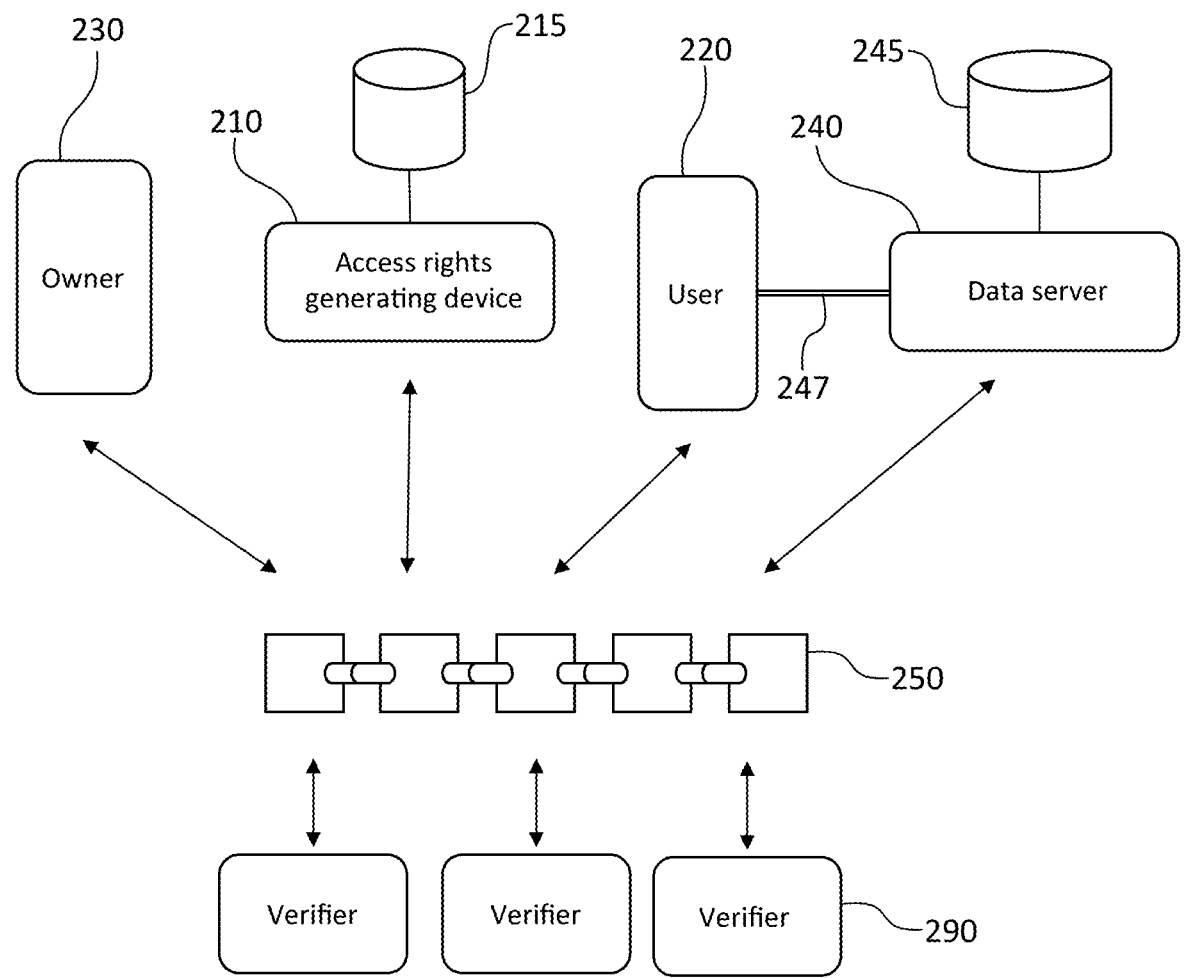
FIG. 2 schematically represents a system capable of implementing a method for managing access rights to personal data according to the present invention.

FIG. 2 schematically represents a system capable of implementing a method for managing access rights to personal data according to the present invention.

In 210 is represented an access rights generating device. This device is in the form of an access token server connected to a first database 215 in which are stored the access profiles of the different users. The access rights generating device is charged with the generation of access tokens for the users having an access profile in the first database. Each access token generated for a user represents the access rights of this user, in compliance with the corresponding access profile. The access rights generating device is further charged with updating the access profiles of the different users, in particular their creation, their modification or their deletion.

The access profiles must comply with access policies. These access policies may differ from one use to the other. Thus, for example, a first set of access policies could be provided when the owner of the personal data is himself the user (in other words, in this case, the owner consults his own data), a second set of access policies when the owner of the personal data gives a possibility of access to a single type of user, and a third set of access policies when the owner of the personal data gives one or more access possibilities to different users. When the system implements several sets of access policies, these sets are stored in a database, designated reference database (not represented).

Whatever the alternative envisaged, a user of the system can formulate a request to access personal data by means of a terminal 220, such as a computer, a tablet or a smartphone. The user may be a natural person or instead an automaton in the form of software hosted in the terminal in question.

If needs be, the system also involves the owner of the personal data who could, by means of a terminal 230, express his consent or his refusal to consent, when the access profile of a user requires collecting the consent of the owner of the data. Obtaining consent will not be necessary when the owner of the personal data is held to consent to the access by virtue of a legal or regulatory obligation or instead because the user is none other than the owner of the personal data (consultation of his own data).

Once the access token has been generated and, if needs be, the consent of the owner of the data has been obtained, the user may be granted an access authorization according to a process that will be described hereafter. The user thereby authorized addresses to the data server 240 a request to consult the personal data. The data server 240 has a second database 245 in which the personal data are stored. The data server then supplies to the user via a secure channel 247 the data corresponding to the authorization that has been granted to him. As will be seen hereafter, the different operations such as the emission of access rights, the expression of the consent of the owner of the data, the formulation of an access request, the granting of an access authorization involves smart contracts (or even a single smart contract grouping together all of their respective functions). These smart contracts are stored in the distributed ledger of a blockchain 250.

Each of the elements of the system, namely the access token server, 210, the terminal of the user, 220, the terminal of the owner of the personal data, 230, and the data server, 240, has an interface enabling it to interact with the blockchain 250.

The correct execution of the smart contracts is verified by verification devices, 290. These verification nodes are in practice nodes having at their disposal a complete copy of the ledger (full nodes). The verification nodes validate the result of this execution according to a consensus mechanism, for example by means of a proof of work, a proof of stake, or even a proof of authority if the blockchain is private.

The different steps of the access management method will be described hereafter in relation with FIGS. 3A to 3C.

Figure 3A:
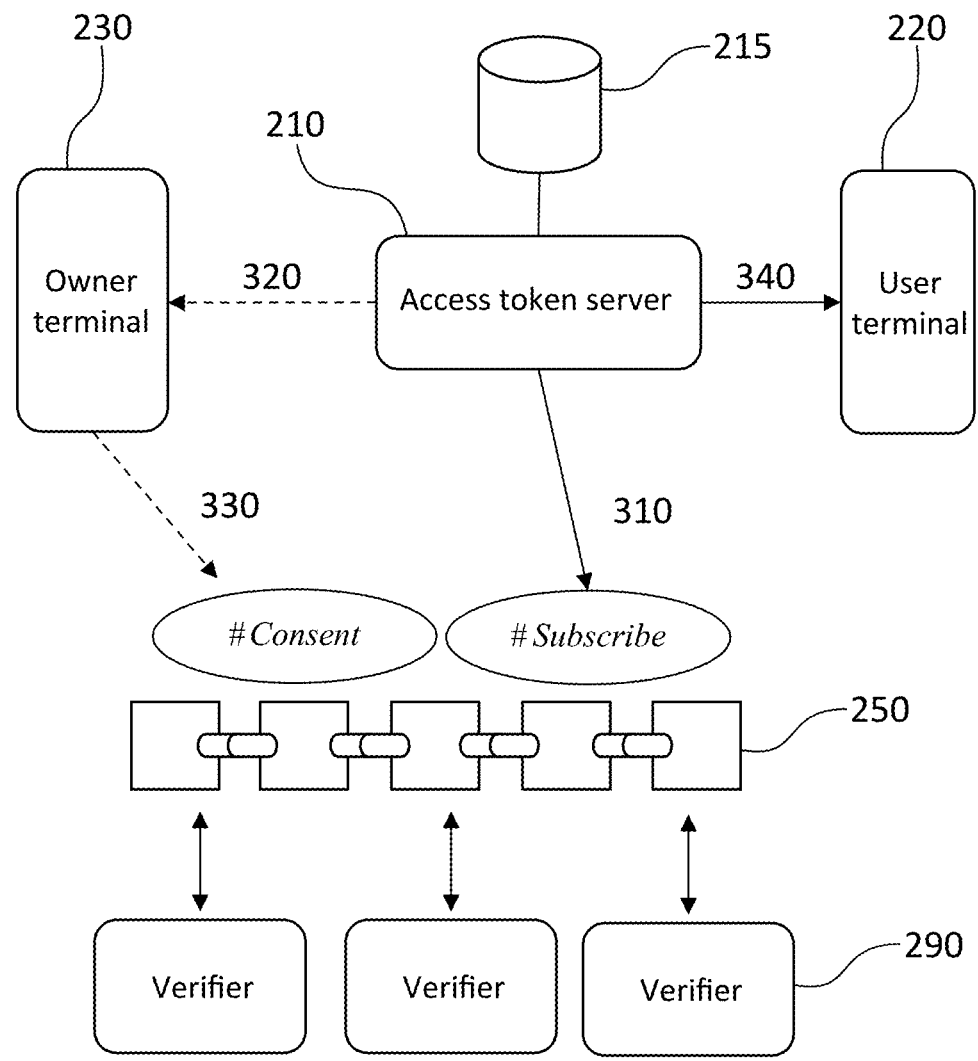
FIGS. 3A to 3C schematically represent the main steps of a method for managing access rights to personal data according to an embodiment of the invention.

The first step represented in FIG. 3A relates to the generation of the access rights of users and their recording in the blockchain.

It is assumed that the access profiles of the different users have been stored beforehand in the first database, 215. The access profiles could have been for example input by means of a GUI interface in a format compliant with the access policies. If needs be, the first database may contain, for a same user, several profiles for different access policies of the reference database.

The access rights generating device (access rights server) generates tokens representing the access rights of the different users to the resources (personal data). A token corresponds to a user for a predetermined use. It is defined by a structured set of data comprising several fields and must comply with the access profile specified in the first database, 215.

A first field contains a token identifier (for example a randomly drawn number), TokUID.

A second field contains the identifier of the user (or of the automaton, or even the connected object), owner of the token. This identifier is, as a general rule, the wallet address of the user. However, when different users are capable of having the same wallet address (case of Ethereum where the wallet address only comprises 180 bits of the print (hash of 256 bits obtained by SHA-256) of the public key obtained)), this second field could also comprise the public key of the user.

A third field contains the identifier of the owner of the personal data. This third field is optional and could be omitted when the owner of the personal data can be deduced in an unambiguous manner from the identifier of the user. As previously, in the event of possible collision between wallet addresses, the third field could also comprise the public key of the owner of the data.

A fourth field comprises the URL where the personal data for which the token gives access are found. It points to a page or a resource where the data is found, for example a page or a file of the data server.

A fifth field comprises a fingerprint (hash) of a set of concatenated access parameters: an identifier of the data source, an identifier of the access policy and the use case authorized under this access policy. The fingerprint characterises the authorized access.

A sixth field, optional, gives the expiry date of the token. If needs be, this field could also indicate if the token has been revoked (Boolean variable).

A seventh field, optional, indicates if the owner of the data has given his consent for the use for which the token is intended (Boolean variable).

An eighth field, optional, indicates if the potential amount associated with the use of the token has indeed been paid.

The order of the different fields may obviously differ from one implementation to the other. Other fields could also be envisaged by those skilled in the art without however going beyond the scope of the present invention.

As an example, an access token structure declaration for Ethereum blockchain is given hereafter, in Solidity language:

```
struct Token {
        uint256 hash; // devid+lot+usage pol
        string locdata; // URL
        address owner; // data owner
        bytes32 publickeyowner; // public key owner
        address user; // token owner / data user
        bytes32 publickeyuser; // public key user
        uint expire; // expiration date
        bool revoked; // validity
        bool consent; // consent from owner
}
mapping(uint128 => Token) public tokens;
```

In this declaration may be successively recognised, the characteristic fingerprint of the authorized access, the URL of the data server, the wallet address of the owner of the data, the public key of this owner, the wallet address of the user, the expiry date of the token, the validity status of the token, the status of the consent of the owner of the data.

The access rights generating device has a wallet address (still called account address in Ethereum) @walletTokserver from which it can emit transactions to the blockchain. This wallet address is obtained by hashing its public key by means of a hash function (such as SHA-256 for example).

At step 310, the access token server (in other words the access rights generating device) transmits a first transaction destined for a first smart contract (#Subscribe), stored in the blockchain, to a predetermined account address. This transaction has for argument an access token in the aforesaid format. This token may have been initialised by indicating that the consent of the owner has not (yet) been given.

The access rights server calls upon a particular function of the contract #Subscribe which contains a locking script (scriptLockPohcy#n where n indexes the use case) associated with the use case considered. This locking script records the token in the distributed ledger of the blockchain.

The owner of the personal data may be induced to provide his consent to the consultation of personal data, either outside of the blockchain (for example by means of a mandate contract signed by the parties), or through the blockchain. The consent granted to a user is generally linked to a particular access profile.

When the consent has to be collected through the blockchain, the access token server transmits a consent request to the owner of the data in 320. The owner gives his consent by transmitting in 330, from his wallet address (or account address), @walletOwner, a transaction (hereafter designated third transaction) destined for a smart contract (designated third smart contract, #Consent) stored in the blockchain. After identification of the owner, said third transaction modifies the state of the Boolean variable Consent expressing the consent from the FALSE value to the TRUE value if the owner of the personal data authorizes access. The third transaction comprises as argument the public key of the owner of the data, a nonce, the value of the variable Consent (FALSE or TRUE) and a digital signature of the transaction by means of the private key of the owner of the data. The nonce may be a transaction order number and has the objective of avoiding replay attacks. Said third contract can verify using this digital signature that the consent indeed emanates from the owner of the data before inscribing the logic value of the consent in the blockchain.

In all cases, the access rights generator 210 next notifies (notification outside of the blockchain) the user in 340 that a token for his intention has been created and stored in the blockchain and communicates to it the identifier of the token thereby created, TokUID.

The user is then able to consult the distributed ledger of the blockchain to read therein, from its wallet address (@walletUser), the token thereby stored.

The access rights generator and the smart contract #Subscribe enable the system to record and manage the respective access rights of the various users in an agile way, thereby ensuring the ability to easily adapt to new access conditions.

The correct execution of the smart contracts #Subscribe and #Consent, the recording of the token and, if needs be, the consent of the owner of the personal data, are verified and validated by the verification nodes, 290, on the basis of the aforesaid consensus mechanism.

Figure 3B:
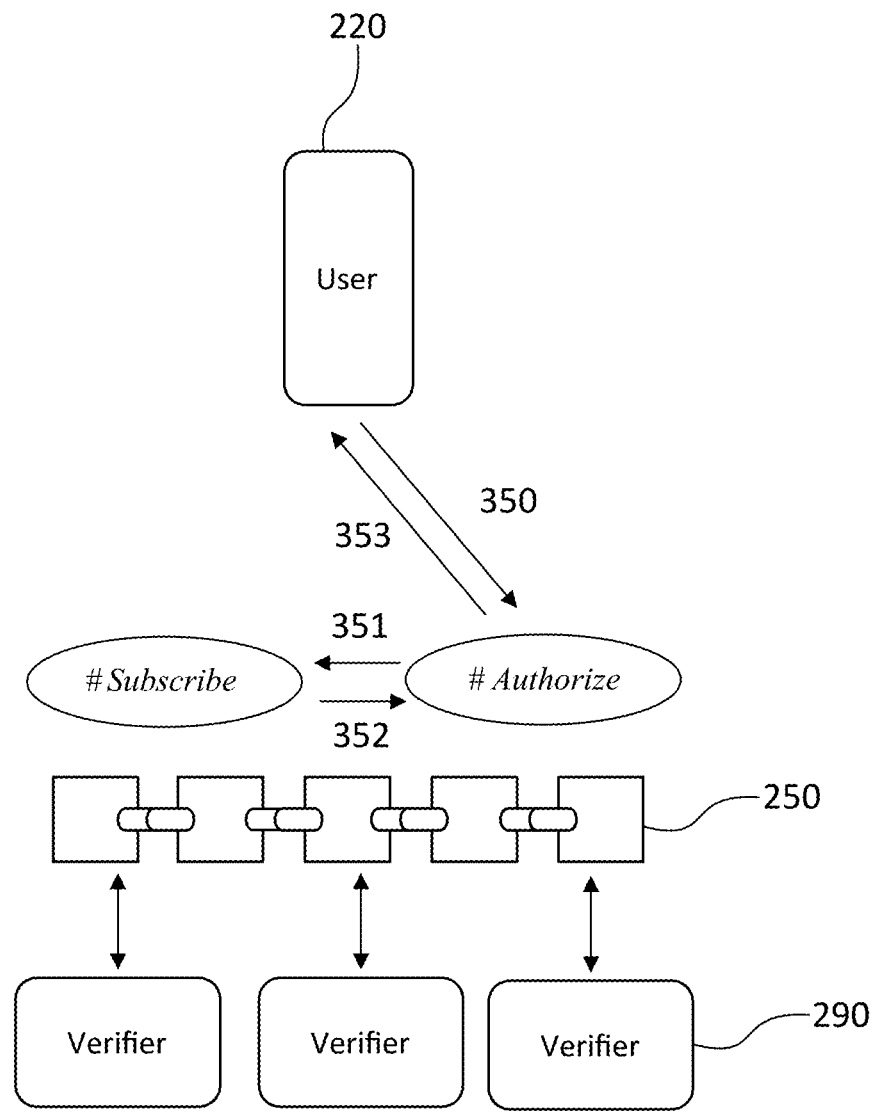

The second step, represented in FIG. 3B, relates to the emission by the user of an authorization request to access the personal data and the authorization that is granted to him in return, if needs be.

The user wishing to obtain an access authorization to the personal data of the owner emits, in 350, a transaction (hereafter designated second transaction), from the wallet address @walletUser and destined for a second smart contract (#Authorize) stored in the blockchain. This transaction is identified by an access authorization request identifier in the form of an order number, IdReq #p, generated by the user.

The second transaction has for argument the public key of the user (PublicKey), the identifier of the access authorization request (IdReq#p), the identifier of the token (TokUID), and a digital signature of the transaction (SigNum) by means of the private key of the user. Digital signature is taken to mean a cryptographic element making it possible to verify that the author of the transaction is indeed that identified by the public key. As an example, when the blockchain is Ethereum, the digital signature may be supplied by the function sign.

The second transaction calls upon a particular function of the smart contract #Authorize, playing the role of unlocking script (scriptUnlockPolicy#n where n indexes the use case) corresponding to the locking script in the contract #Subscribe.

The unlocking script calls in 351 the first smart contract, #Subscribe, by providing to it as argument the identifier of the token, TokUID. Using this identifier, the smart contract #Subscribe recovers the token and transmits it in 352 to the smart contract #Authorize. The unlocking script uses the cryptographic elements provided by the user, namely the public address of the user, PublicKey, as well as the digital signature of the transaction, SigNum, to unlock the token.

If the cryptographic elements indeed correspond to those indicated in the locking script, the token is unlocked and, if it is still valid (if the date indicated in the sixth field of the token is indeed later than the expiry date), an access authorization (AuthZ) is stored in relation with its identifier (IdReq#p) in the distributed ledger of the blockchain. The access authorization contains the identifier of the token for which it has been granted (TokUID). The access authorization comprises if needs be the validity parameters of this authorization: period of validity, maximum number of consultations, etc.

On the other hand, if the cryptographic elements do not correspond to those expected or if the token is no longer valid, no access authorization is stored in the distributed ledger of the blockchain. If needs be, the second transaction will comprise the payment of an amount in cryptocurrency to remunerate the access service and/or the owner of the personal data. The payment of the price could constitute a condition to meet to obtain the authorization.

The user is able to consult the distributed ledger and to determine if an access authorization has been granted or not to him and under what conditions. More specifically, he could read the status of the access authorization in the ledger in relation with the identifier IdReq #p.

Here again, the correct execution of the smart contracts #Authorize and #Subscribe, the unlocking of the token, the conditions of use, the payment of the price required, the recording of the access authorization are verified and validated by the verification nodes, 290, on the basis of the aforesaid consensus mechanism.

Figure 3C:
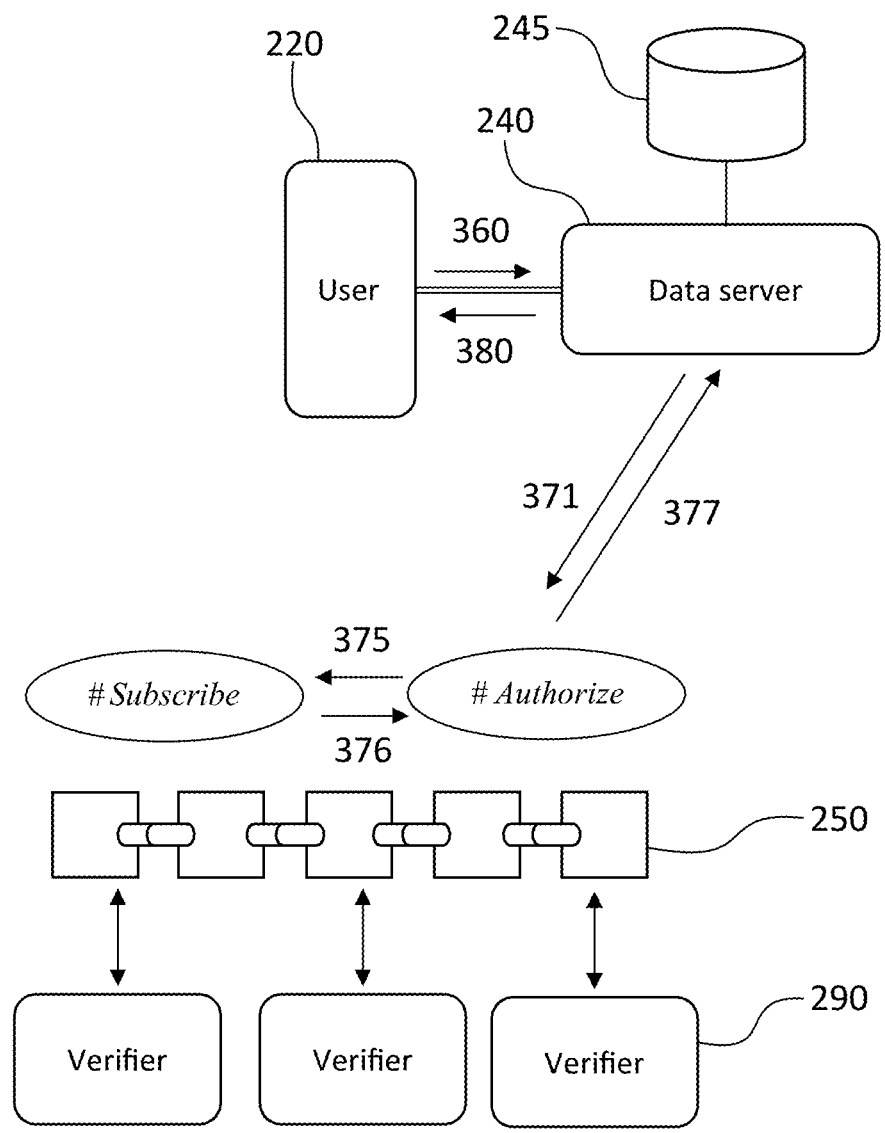

The third step, represented in FIG. 3C, relates to the actual access to the personal data by the user.

The user transmits in 360, by means of his terminal 220, a request to access the personal data destined for the data server, 240, via the secure channel, 247. This request comprises the identifier of the access authorization request, IdReq#p, as well as the parameters of the requested access (identifier of the data source, identifier of the access policy and the authorized use case). It is worth noting that the access parameters are unscrambled because they do not disclose in themselves personal data.

The data server then interrogates the second smart contract #Authorize by supplying to it the access authorization request identifier, IdReq#p in 371. The contract #Authorize verifies that an access authorization corresponding to the number has indeed been granted to the user and, in the affirmative, interrogates in 375 the first smart contract #Subscribe by transmitting to it the token identifier (TokUID) and obtaining in return, 376, the corresponding token. The contract #Authorize returns, in 377, the token in question to the data server.

The data server verifies (by means of the hash function) that the characteristic fingerprint appearing in the token indeed corresponds to the access parameters contained in the access request and, in the affirmative, extracts the personal data from the second database 245 at the URL specified in the token. The data in the database may be stored in encrypted form or in unscrambled form. When they are encrypted, the encryption keys may be stored in a digital vault (or secure element). The access server can access the secure element and read the appropriate encryption key to de-encrypt the data at the address specified by the reading pointer.

If needs be, if several addresses are specified, the personal data read may be aggregated by the data server, prior to their transmission. Generally speaking, the server can carry out a processing of the data thereby read before transmitting them to the user.

At step 380, the data server transmits to the user, via the secure channel, the extracted personal data, after having aggregated them, if necessary.

Those skilled in the art will understand that the sequencing of the steps described previously and, in particular, the change of state of the variables of the contract(s), the recording and the access authorization may be verified at any instant, by any node having at its disposal a complete copy of the chain. The validation is carried out by the verification nodes according to the aforesaid consensus mechanism, without it being necessary to resort to a centralised trusted third party.

Figure 4:
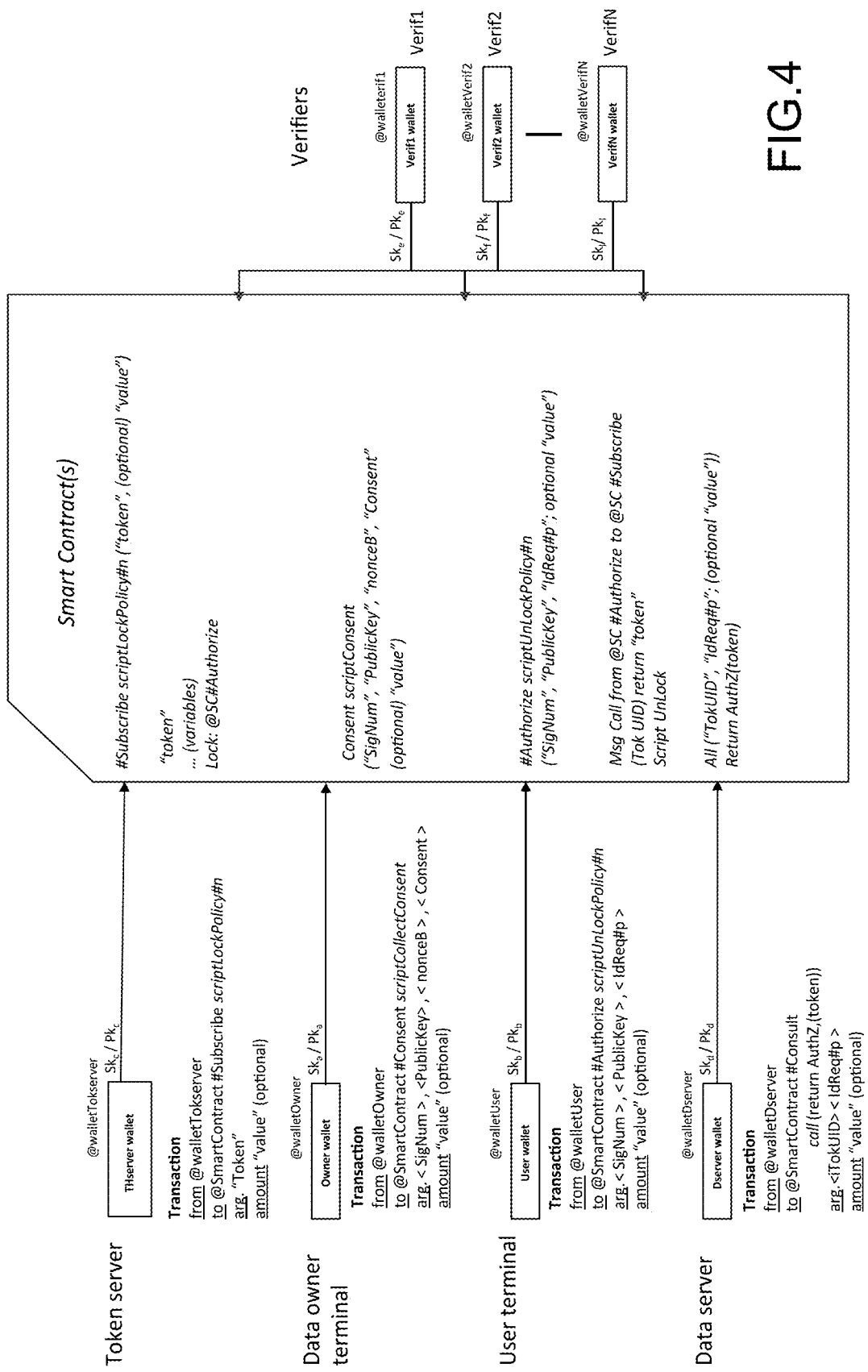
FIG. 4 schematically represents the interactions of a smart contract with the elements of the system of FIG. 2 during the steps implemented in FIGS. 3A-3C.

FIG. 4 schematically represents the interactions of a smart contract with the devices of the system of FIG. 2 during the implementation steps in FIGS. 3A-3C.

On the left of the figure are represented the different devices of the system, namely the access token server, 210, the terminal of the owner of the data, 230, the terminal of the user, 220, and the data server, 240.

At the centre of the figure is represented the smart contracts stored in the blockchain, namely #Subscribe, #Consent, #Authorize. Alternatively, #Subscribe, #Consent, #Authorize may be functions grouped together within a same contract.

On the right of the figure have been represented the verification nodes charged with verifying notably the execution of the code of the smart contracts and mining the blocks.

The token server has a wallet address (still called account address in Ethereum), @walletTokserver, from which it can emit transactions to the blockchain, in particular the first transaction destined for the first smart contract #Subscribe. More specifically, this first transaction is sent to the locking script scriptLockPolicy#n of this contract, with for argument the access token and, if needs be, an amount in cryptocurrency if a remuneration (for example of the owner of the data or the data server) is provided.

The terminal of the owner of the data has a wallet address, @ walletOwner, from which it can emit transactions to the blockchain, in particular the third transaction destined for the smart contract, #Consent, containing a script scriptCollectConsent.

This transaction has for arguments the public key corresponding to the aforesaid wallet address, PublicKey, a nonce NonceB to avoid replay attacks, the Boolean value expressing the consent Consent, as well as the digital signature SigNum of the transaction by means of the private key associated with the public address of the wallet, @walletOwner.

The terminal of the user has a wallet address, @walletUser, from which it can emit transactions to the blockchain, in particular the second transaction destined for the second smart contract, #Authorize. This transaction has for argument the public key of the user, PublicKey, the access authorization request identifier, IdReq#p, and a digital signature of the transaction SigNum by means of the private key associated with the wallet address @walletUser.

Finally, the data server itself has a wallet address, @walletDserver, from which it can emit transactions to the blockchain. It can notably interrogate from its wallet address the second smart contract by transmitting to it as argument the access authorization request identifier, IdReq#p. It receives in return, if the access authorization has indeed been granted and if needs be if the consent of the owner of the data has indeed been granted, the access token of the user.

According to an alternative, the potential payments in cryptocurrency may be managed by a specific smart contract which keeps up to date a ledger of the different elements of the system. For example if the blockchain is Ethereum, this specific contract may be a ERC-20 contract, (designated #TokenERC20).

Figure 5A:
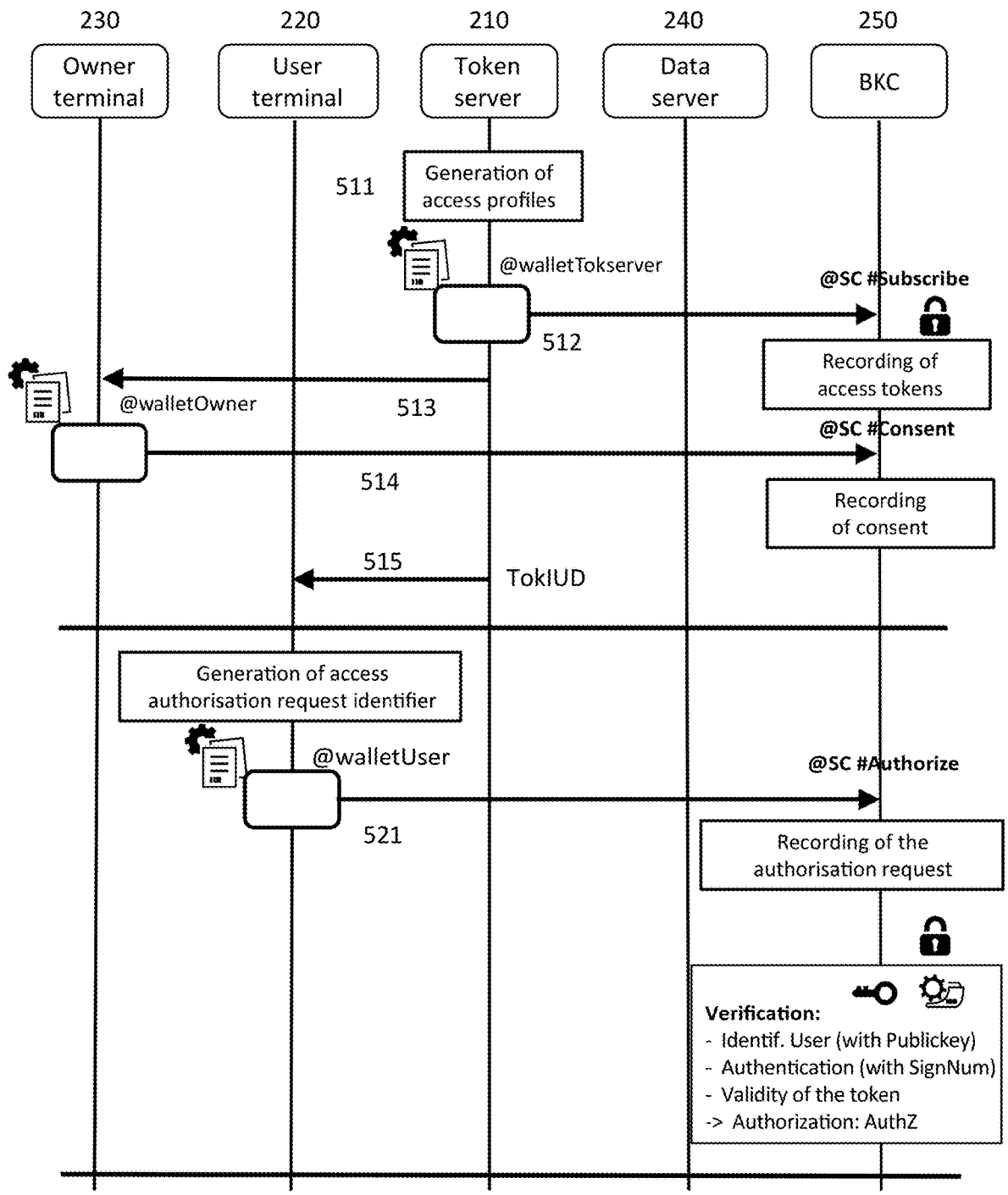
FIGS. 5A and 5B schematically represent the messages and transactions exchanged between elements of the system of FIG. 2 during the steps implemented in FIGS. 3A-3C.
Figure 5B:
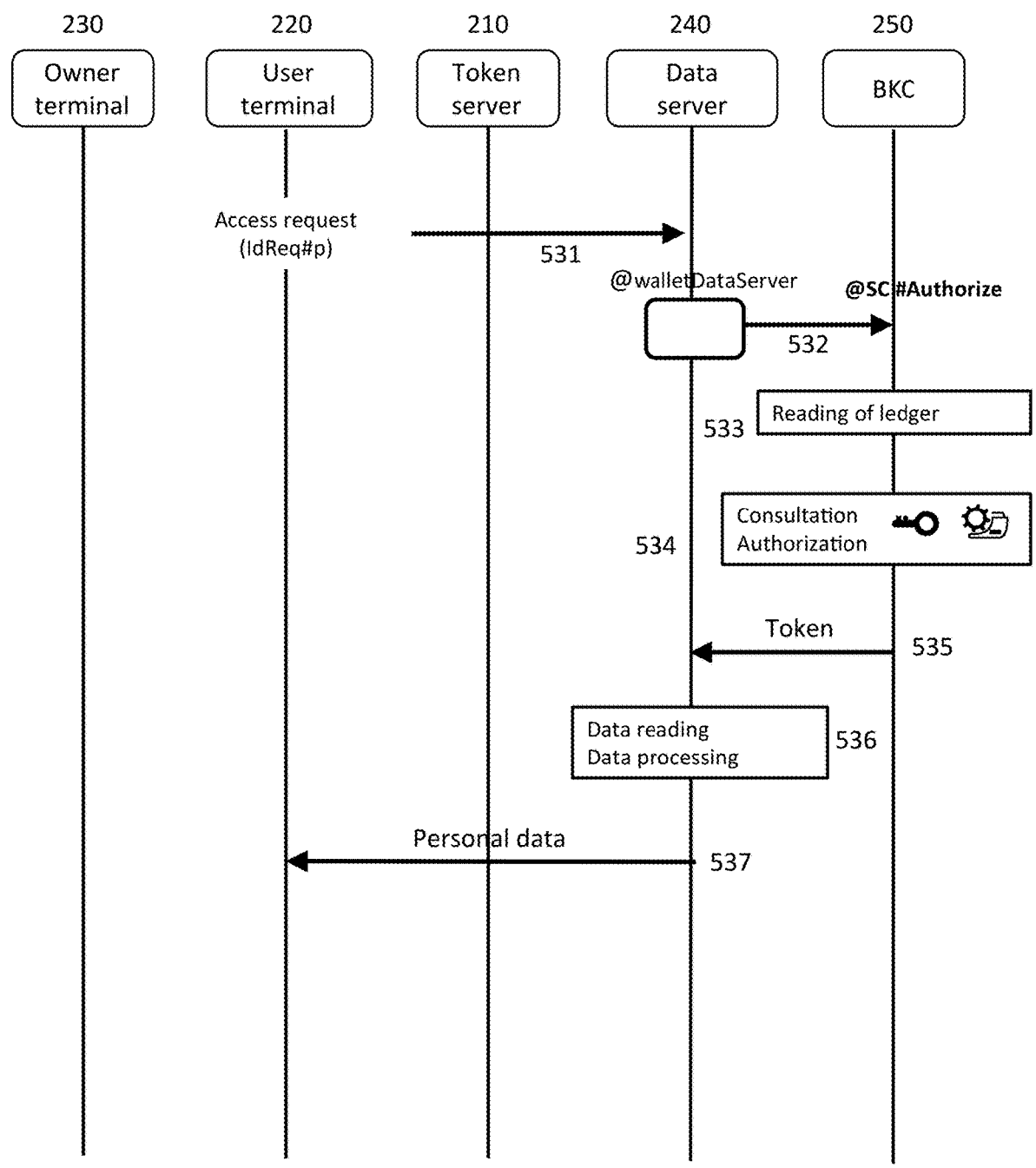

FIGS. 5A-5B illustrate in a schematic manner the exchange of messages, transactions and consultations between elements of the system of FIG. 2 during the steps implemented in FIGS. 3A-3C.

In the columns are represented the different players of the access management system: the terminal of the owner of the personal data, 230, the terminal of the user, 220, the access rights server (access token server), 210, the data server, 240, and the blockchain, 250, support for the execution of the smart contracts #Subscribe, #Consent, #Authorize, #TokenERC20.

At sub-step 511, the access profiles of the different users are input in the form of electronic files, via a GUI for example. These access profiles are compliant with the access policies stored beforehand in the reference database as a function of the uses. The profiles of the users are for reading only. If needs be, the owners of personal data may have both reading and writing access profiles. In systems for accessing personal data generated by connected sensors (IoT), the sensors may have writing profiles only. Whatever the case, the different users have to be able to be identified and authenticated by the access server before being able to access the second database.

At sub-step 512, the access token server generates, from its wallet address, @walletTokserver, a token for the user at the address scriptLockPolicy#n of the locking script of the first smart contract, #Subscribe. The access token of the user is stored by the locking script in the distributed ledger, for the use #n.

Optionally, at sub-step 514, the owner of the personal data gives his consent to access his data by transmitting a (third) transaction to the second smart contract #Consent. He supplies cryptographic elements to the contract making it possible to identify him (his public key) and to authenticate it (digital signature of the transaction), and a logic variable expressing consent (or his refusal).

The access token server notifies in 515 the user that an access right has been created in his favour and transmits to him the token in question, TokUID.

The second step relates to an access authorization request by the user.

The user wishing to access the personal data of the owner submits an access authorization request to the second smart contract, #Authorize in 521. This request is recorded in the distributed ledger. The contract in question delivers an access authorization after having authenticated the author of the request and having verified the validity of his access token and, if needs be, the consent of the owner of the data. To do so, it executes an unlocking script delivering the access authorization if the identity of the user (@walletUser) is legitimate, if he is indeed the owner of the token and that the access token is valid. In the event where the consent of the owner is required, the unlocking script also verifies if the consent is indeed inscribed in the distributed ledger. If the verification is conclusive, the unlocking script supplies an access authorization (AuthZ) according to the access policy #n. By default, the authorization is refused and no authorization is recorded in the blockchain.

The third step relates to the access request of the user to the data server.

The user transmits in 531 to the data server, via the secure channel, an access request having for arguments the access authorization request identifier, IdReq#p, and the parameters of the requested access (identifier of the data source, identifier of the access policy and the authorized use case under this access policy).

The data server then interrogates the second smart contract #Authorize by transmitting to it in 532, from its wallet address, @walletDataServer, a transaction comprising the access authorization request identifier, IdReq#p. This smart contract verifies that the authorization is indeed recorded in 533 and, in the affirmative, consults in 534 the first contract #Subscribe to recover the token corresponding to the identifier TokUID) appearing in the access authorization. The token is next sent back to the data server in 535 and the server verifies that the characteristic fingerprint that it contains indeed corresponds to the parameters appearing in the access request.

The data server next reads in 536 the personal data stored in the second database, by following the URL specified in the token.

If needs be, the server carries out a processing of the data thereby read. For example, it can aggregate data coming from different recordings. It may also be authorized to process or disclose only a part of the data read (accessed), the processing being defined by the use appearing in the token previously obtained from the blockchain.

The data thereby read and, if needs be processed, are transmitted to the user in 537, via the secure channel.

The invention claimed is:

1. A method for accessing personal data belonging to a data owner, the access rights of a user to these personal data for a predetermined use being represented by an access token, said method comprising:
(a) generating access tokens by an access token server in accordance with access policies stored in a first database hosted by said access token server, the access token of said user being identified by a token identifier and transmitted, with a first transaction, to a first smart contract stored in a blockchain, the first smart contract recording the access token in the blockchain;

(b) transmitting by a terminal of said user, with a second transaction, an access authorization request identified by an authorization request identifier, to a second smart contract stored in the blockchain, the second smart contract interrogating the first smart contract and obtaining the access token by supplying to the first smart contract cryptographic elements to authenticate the user, then determining when the access conditions contained in the access token are met and, in the affirmative, recording an access authorization in the blockchain;

(c) transmitting by the terminal of said user an access request to a data server hosting a second personal database in which are stored said personal data, the access request comprising said authorization request identifier, the data server interrogating the second smart contract by supplying to the second smart contract said authorization request identifier, the second smart contract returning to the data server the access token corresponding to the access request when the access authorization corresponding to the authorization request identifier is recorded in the blockchain, the data server reading the personal data stored in the second personal database, at a URL specified in the access token, and transmitting the personal data to the terminal of said user.

2. The method for managing access to personal data according to claim 1, wherein at step (a), following emission of the first transaction, the access token server transmits a consent request to the terminal of the data owner of the personal data and that the terminal of the data owner emits a third transaction destined for a third smart contract stored in the blockchain, the third transaction comprising a first Boolean variable indicating consent or refusal of the consent of the data owner of the personal data to access the personal data by said user.

3. The method for managing access to personal data according to claim 1, wherein the second transaction comprises payment of an amount in cryptocurrency to the data owner of the personal data.

4. The method for managing access to personal data according to claim 1, wherein said cryptographic elements comprise a public key of the user and a wallet address obtained by hashing of said public key.

5. The method for managing access to personal data according to claim 1, wherein, prior to step (b), the token identifier is transmitted to the terminal of said user.

6. The method for managing access to personal data according to claim 1, wherein at step (b) the access authorization request is recorded in the blockchain.

7. The method for managing access to personal data according to claim 1, wherein the access token has a first field containing the token identifier, a second field containing an identifier of the user, a third field containing an identifier of the data owner of the personal data, a fourth field containing the URL where the personal data is found and a fifth field containing a digital fingerprint of a set of access parameters.

8. The method for managing access to personal data according to claim 7, wherein at step (c) the access request transmitted by the terminal of said user further comprises said set of access parameters and the data server verifies that the digital fingerprint contained in the access token indeed corresponds to said set of access parameters before reading the stored personal data and transmitting the personal data to said user.

9. The method for managing access to personal data according to claim 7, wherein the second field comprises a wallet address of the user and a public key of the user and the third field comprises a wallet address of the data owner and a public key of the data owner.

10. The method for managing access to personal data according to claim 7, wherein the access token has a sixth field containing an expiration date of said access token.

11. The method for managing access to personal data according to claim 7, wherein the access token has a seventh field containing a Boolean variable indicating when the data owner of the personal data has given consent.

12. The method for managing access to personal data according to claim 7, wherein the access token has an eighth field containing a Boolean variable indicating when an amount required for use of the access token has been paid.

13. The method for managing access to personal data according to claim 1, wherein a fourth smart contract is stored in the blockchain, this fourth smart contract having a function of keeping up to date a balance of the cryptocurrency accounts of the user, of the data owner of the personal data, of the access token server and of the data server.

14. The method for managing access to personal data according to claim 1, wherein at step (c), the personal data read in the second database are transmitted to the terminal of said user via a secure channel.

15. The method for managing access to personal data according to claim 14, wherein the data server carries out a processing of the personal data before transmitting them to the terminal of said user.

16. A system for managing access to personal data comprising an access token server hosting a first database containing the access profiles of different users, a terminal of a user, a data server hosting a second database in which are stored said personal data, the terminal of said user being connected to the data server via a secure channel, wherein the access token server, the terminal of said user and the data server each have an interface enabling them to communicate with a blockchain;

said access token server including processing circuitry being configured to generate an access token for a user, in accordance with the access policies stored in the first database, and to transmit said access token, identified by a token identifier, to a first smart contract stored in the blockchain, with a first transaction, the first smart contract recording the access token in the distributed ledger of the blockchain;

the terminal of said user including processing circuitry being configured to transmit, with a second transaction, an access authorization request identified by an authorization request identifier, to a second smart contract stored in the blockchain, the second smart contract interrogating the first smart contract and obtaining the access token by supplying to the first smart contract cryptographic elements to authenticate the user, then determining when access conditions contained in the access token are met and, in the affirmative, recording an access authorization in the blockchain;

the processing circuitry of the terminal of said user being further configured to transmit an access request to the data server, the access request comprising said authorization request identifier, the data server then interrogating the second smart contract by supplying to the second smart contract said authorization request identifier, the second smart contract returning to the data server the access token when the access authorization corresponding to the authorization request identifier is recorded in the blockchain;

the data server including processing circuitry being configured to read the personal data stored in the second database, at a URL specified in the access token, and to transmit the personal data to the terminal of said user via the secure channel.

\* \* \* \* \*